UNITED STATES PATENT OFFICE.

MERRITT L. STODDARD, OF CORNING, NEW YORK.

IMPROVEMENT IN BURNING-FLUIDS.

Specification forming part of Letters Patent No. 67,373, dated July 30, 1867.

*To all whom it may concern:*

Be it known that I, MERRITT L. STODDARD, of Corning, State of New York, have invented certain new and useful Improvements in Burning-Fluids; and I do hereby declare that the following is a full, clear, and exact description of the manner in which I prepare the same.

The ingredients I use are benzine, sweet spirits of niter, and gum-camphor. I am aware that the same ingredients have been before used for the same purpose; but they have been, so far as I know, combined with other articles, making a more expensive fluid, and in no way enhancing the quality of the light.

The manner in which I prepare my fluid is as follows: To make forty gallons of fluid I take this quantity of benzine, one pound of sweet spirits of niter, and three-fourths of a pound of gum-camphor. I take one gallon of the benzine, and put the gum-camphor in it. After letting it stand for twenty-four hours, or a sufficient length of time for the camphor to thoroughly dissolve, I pour this mixture into the vessel containing the benzine. I then put the sweet spirits of niter in the same vessel, which, after being shaken, is permitted to stand long enough to settle, after which the fluid is ready for use.

The advantages of my fluid are, first, it is non-explosive; second, the flame is capable of withstanding almost any draft; third, it is exceedingly economical, while the light it emits is brilliant, yet soft and pleasant to the eyes.

I do not claim the ingredients combined for the purpose of producing light; but

What I do claim, and desire to secure by Letters Patent, is—

The within-named ingredients, when mixed in the proportions herein set forth, for the purpose described.

MERRITT L. STODDARD.

Witnesses:
F. A. LEHMAN,
J. F. ELLIS.